(12) United States Patent
Goller et al.

(10) Patent No.: US 8,117,868 B2
(45) Date of Patent: Feb. 21, 2012

(54) APPARATUS AND METHODS FOR MAKING GLASS

(75) Inventors: Martin Herbert Goller, Painted Post, NY (US); Matthew Carl Morse, Campbell, NY (US); G Kris Schwenke, Sayre, PA (US)

(73) Assignee: Corning Incorporated, Corning, NY (US)

( * ) Notice: Subject to any disclaimer, the term of this patent is extended or adjusted under 35 U.S.C. 154(b) by 256 days.

(21) Appl. No.: 12/509,668

(22) Filed: Jul. 27, 2009

(65) Prior Publication Data
US 2011/0016919 A1    Jan. 27, 2011

(51) Int. Cl.
C03B 5/24    (2006.01)
(52) U.S. Cl. ..................... 65/29.12; 340/623
(58) Field of Classification Search ........... 65/29.12, 65/29.17, 158, 122, 126, 129; 222/591, 594, 222/629; 340/623
See application file for complete search history.

(56) References Cited

U.S. PATENT DOCUMENTS

| | | | | |
|---|---|---|---|---|
| 2,050,205 | A | * | 8/1936 | Bailey .............................. 65/132 |
| 2,569,459 | A | | 8/1945 | DeVoe .............................. 49/77 |
| 3,233,993 | A | | 2/1966 | Weidel ............................. 65/374 |
| 3,533,770 | A | | 10/1970 | Adler et al. ....................... 65/131 |
| 3,656,924 | A | | 4/1972 | Chapman et al. ................. 65/32 |
| 3,743,492 | A | | 7/1973 | Ogita ................................ 65/32 |
| 3,871,853 | A | | 3/1975 | Dietz et al. ........................ 65/32 |
| 3,883,340 | A | | 5/1975 | French et al. .................... 65/134 |
| 3,971,646 | A | | 7/1976 | Rhodes ............................. 65/157 |
| 5,588,978 | A | * | 12/1996 | Argent et al. ..................... 65/29.1 |
| 7,127,919 | B2 | | 10/2006 | Goller et al. ..................... 65/135.3 |
| 7,383,698 | B2 | * | 6/2008 | Ichinose et al. ............... 65/134.1 |
| 2006/0042318 | A1 | | 3/2006 | Burdette et al. .............. 65/134.2 |
| 2006/0242996 | A1 | | 11/2006 | DeAngelis et al. .......... 65/134.1 |
| 2008/0184741 | A1 | | 8/2008 | Mueller et al. ............... 65/29.14 |

FOREIGN PATENT DOCUMENTS

| | | |
|---|---|---|
| GB | 690261 | 4/1953 |
| GB | 1449215 | 9/1976 |
| JP | 2002-253942 | 10/2002 |

OTHER PUBLICATIONS

J.H. Campbell, et al., *Elimination of Platinum Inclusions in Phosphate Laser Glasses*, Lawrence Livermore National Laboratory, pp. 1-62, May 26, 1989.
R.J. Ginther, *The Contamination of Glass by Platinum*, Journal of Non-Crystalline Solids 6, pp. 294-306 (1971).
Pellegrano, Joan L. ITP Glass: Glass Industry of the Future: Energy and Environmental Profile of the U.S. Glass Industry; Apr. 2002. Retrieved from the internet <URL: http://www.1.eere.energy.gov/industry/glass/pdfs/glass2002profile.pdf>.

* cited by examiner

*Primary Examiner* — Matthew Daniels
*Assistant Examiner* — Yana Belyaev
(74) *Attorney, Agent, or Firm* — Siwen Chen

(57) ABSTRACT

Apparatus and methods for making glass are provided. The apparatus comprise a first glass melt station and a standpipe. The standpipe includes a first end portion in fluid communication with the first glass melt station. The standpipe further includes a gravity trap that is configured to inhibit formed impurities from traveling from at least a portion of the standpipe through the first end portion of the standpipe. The methods comprise the steps of providing the first glass melt station with glass melt, sensing a condition of a quantity of glass melt within the standpipe, and inhibiting formed impurities from traveling from at least a portion of the standpipe through the first end portion of the standpipe.

20 Claims, 4 Drawing Sheets

APPARATUS AND METHODS FOR MAKING GLASS

TECHNICAL FIELD

The present invention relates generally to apparatus and methods for making glass and, more particularly, to apparatus and methods to inhibit formed impurities from being entrained in a flow of glass melt.

BACKGROUND

Glass manufacturing systems are commonly used to form various glass products such as LCD sheet glass. There is a need to inhibit formed impurities from being entrained in a flow of glass melt during the manufacturing process. For example, platinum particles may be formed by certain components of a conventional glass manufacturing system. At temperatures near or above 600° C., platinum in system components may oxidize to form $PtO_2$ gas according to the following equation:

$$Pt(s) + O_2(g) \leftrightarrow PtO_2(g)$$

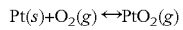

Based on this equation, if the temperature or oxygen concentration decreases, some of the $PtO_2$ gas can be reduced to particles containing platinum metal. A standpipe of a conventional glass manufacturing system may be a source of platinum particles. Indeed, the standpipe typically includes platinum, the composition being, for example, 90/10 Pt/Rh, and the temperature of the glass surface is kept at about 1400° C. underneath an air atmosphere.

The standpipe is known to allow a glass level probe to gauge a level of glass in the glass manufacturing system. Typically, the standpipe vertically extends above glass melt flowing through the system. As the standpipe is in fluid communication with the glass melt, platinum particles formed within the standpipe may simply sink through the standpipe and contaminate the glass melt moving through the system below the standpipe.

SUMMARY

The following presents a simplified summary of the disclosure in order to provide a basic understanding of some example aspects described in the detailed description.

In one example aspect, a method of making glass with an apparatus is provided. The apparatus comprises a first glass melt station and a standpipe including a first end portion in fluid communication with the first glass melt station. The method comprises the steps of providing the first glass melt station with glass melt, sensing a condition of a quantity of glass melt within the standpipe, and inhibiting formed impurities from traveling from at least a portion of the standpipe through the first end portion of the standpipe.

In another example aspect, an apparatus for making glass comprises a first glass melt station and a standpipe. The standpipe includes a first end portion in fluid communication with the first glass melt station. The standpipe further includes a gravity trap that is configured to inhibit formed impurities from traveling from at least a portion of the standpipe through the first end portion of the standpipe.

In yet another example aspect, an apparatus for making glass comprises a first glass melt station and a second glass melt station. The apparatus further comprises a glass melt conduit providing fluid communication between the first glass melt station and the second glass melt station. The apparatus also includes a standpipe with a first end portion in fluid communication with the glass melt conduit, a second end portion configured to receive a glass melt sensor, and a gravity trap. The gravity trap is configured to inhibit formed impurities from traveling to the glass melt conduit from at least a portion of the standpipe.

BRIEF DESCRIPTION OF THE DRAWINGS

These and other aspects are better understood when the following detailed description is read with reference to the accompanying drawings, in which.

DETAILED DESCRIPTION

Figure 1:
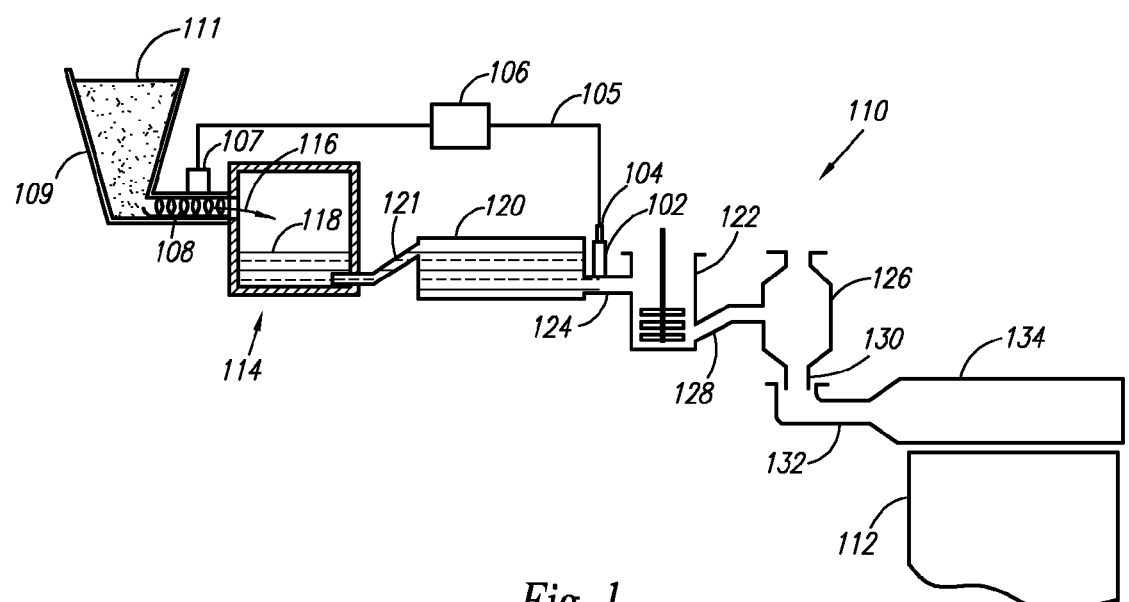
FIG. 1 is a schematic view of an apparatus for making glass.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

FIG. 1 illustrates a schematic view of an apparatus 110 for making glass, such as glass sheets 112. The apparatus 110 can include a melting vessel 114 configured to receive batch material 111 from a storage bin 109. The batch material 111 can be introduced by a batch delivery device 108 powered by a motor 107. A controller 106 can be configured to activate the motor 107 to introduce a desired amount of batch material 111 into the melting vessel 114. Once introduced, the melting vessel 114 can apply heat to the batch material 111 to produce glass melt 118. For clarity, FIG. 1 does not schematically illustrate the glass melt 118 in all areas of the apparatus 110.

The Melting vessel 114 is typically made from a refractory material, such as refractory (e.g. ceramic) brick. The apparatus 110 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of a first connecting tube 121, a fining vessel 120 (e.g., finer tube), a second connecting tube 124, a standpipe 102, a mixing vessel 122 (e.g., a stir chamber), a third connecting tube 128, a delivery vessel 126 (e.g., a bowl), a downcomer 130 and an inlet 132. Inlet 132 is coupled to forming vessel 134 (e.g., fusion pipe) and receives glass melt from the downcomer 130. The forming vessel 134 is also made from a refractory material and is designed to form the glass sheet 112.

The melting vessel 114, fining vessel 120, the mixing vessel 122, delivery vessel 126, and forming vessel 134 are examples of glass melt stations that may be located in series along the apparatus 110. The first connecting tube 121 can provide fluid communication between the melting vessel 114 and the fining vessel 120. The second connecting tube 124 can provide fluid communication between the fining vessel 120 and the mixing vessel 122. Still further, the third connecting tube 128 can provide fluid communication between the mixing vessel 122 and the delivery vessel 126.

Figure 2:
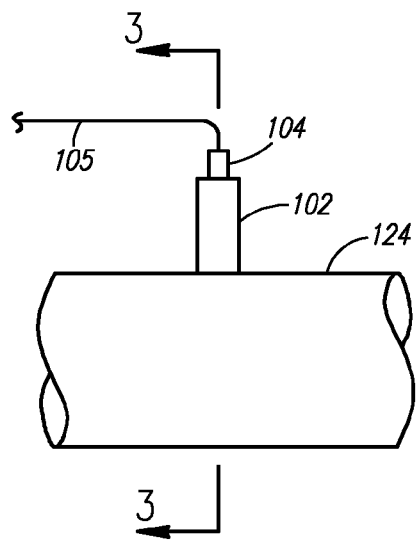
FIG. 2 is an enlarged view of a portion of the apparatus of FIG. 1 with a glass level probe positioned with respect to a standpipe of the apparatus.

FIG. 2 shows an enlarged view of a portion of the apparatus 110 shown in FIG. 1 with a glass level probe 104 positioned with respect to a schematic depiction of the standpipe 102. As illustrated, the standpipe 102 can be provided with an open end designed to receive the glass level probe 104 to measure a level of glass melt in the apparatus 110. The standpipe can be provided in a wide variety of locations. For example, the standpipe can be placed in direct communication with one of the stations, such as the fining vessel 120. In further examples the standpipe can be placed in indirect communication with one of the stations. For example, as shown, the standpipe 102 can be placed in direct fluid communication with the second connecting tube 124 and therefore in indirect fluid communication with the fining vessel 120.

Figure 3:
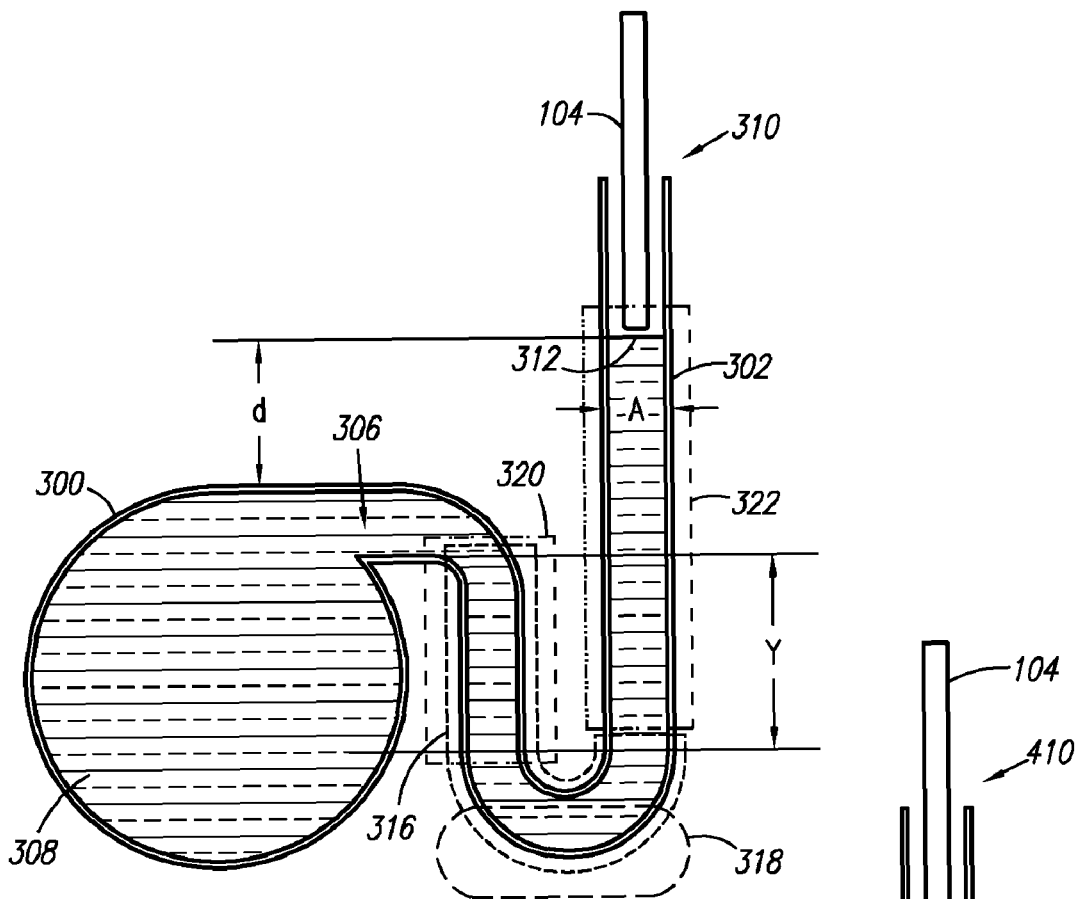
FIGS. 3-8 are cross-sectional views along line 3-3 of FIG. 2 illustrating example standpipes.

Referring to FIG. 3, a cross-sectional view of an example standpipe 302 is shown. The cross-sectional view is also provided through the structure from which the standpipe 302 extends. The tube section 300 can include a circular cross section although rectangular or other cross sectional shapes may be provided in further examples. The standpipe 302 can also have a circular cross section although other cross-sectional shapes, whether made up of curved or straight lines (e.g., polygons) or a combination thereof (e.g. oval shapes), may be provided in further examples. Moreover, the standpipe 302 may include one or more bends or windings. The standpipe 302 extends from the tube section 300 at a first end portion 306 that provides a fluid connection between the tube section 300 and the standpipe 302. The standpipe 302 may extend from a periphery or circumference of the tube section 300 in various ways. For example, as shown, the standpipe 302 may extend laterally from a top portion of the tube section 300. The standpipe 302 may also extend vertically upward or downward or at an angle from the tube section 300 and the shape and orientation of the standpipe 302 may be affected factors such as manufacturing considerations.

During manufacture of glass, the standpipe 302 is filled with glass melt 308 up to a predetermined level and an open, second end portion 310 of the standpipe 302 exposes glass melt 308 such that the glass level probe 104 may be inserted to gauge the level of glass melt 308 in the apparatus 110. The predetermined level of glass melt 308 may be, for example, at a level d of two to four inches above a top of the tube section 300. The second end portion 310 is vertically oriented so that the glass level probe 104 can simply be dropped into the second end portion 310 to touch the top glass melt surface 312. Only the tip of the glass level probe 104 is designed to touch the glass melt surface 312 and the glass level probe 104 is vertically movable being able to adjust to and detect a change in the level of glass surface 312. Other means of measuring glass melt level is also contemplated and, for example, a sensor may be mounted on an interior wall of the standpipe 302 and measure fluctuations in the glass melt level.

The standpipe 302 can primarily be divided into a sink portion 322 and a gravity trap 316. The gravity trap 316 is located between the first end portion 306 and the second end portion 310 such that the formed impurities can collect and be inhibited from traveling through the first end portion 306 of the standpipe 302 and into the stream of glass melt 308 in the tube section 300. The gravity trap 316 can be further divided into a particle collection area 318 and a buffer portion 320.

The sink portion 322 of the standpipe 302 is located between the second end portion 310 and the gravity trap 316, and is adapted to allow the formed impurities to sink or precipitate through the glass melt 308 and settle at the particle collection area 318. In this embodiment, the sink portion 322 is a vertical section of the standpipe 302 that is without any bend allowing the formed impurities to reach the particle collection area through gravitation pull without any other interference. Other embodiments of the sink portion 322 may have varying shape or orientation being curved or angled while accomplishing the same function, i.e., allow the formed impurities to sink to the particle collection area 318.

The gravity trap 316 may be formed integrally or separately with respect to the standpipe 302 and, in this embodiment, includes a substantially U-shaped portion of the standpipe 302. The gravity trap 316 is located at a lower elevation relative to the second end portion and forms the particle collection area 318 such that formed impurities, such as platinum inclusions, can sink or precipitate to the particle collection area 318 due to the difference in density compared to glass melt 308. In this embodiment, the particle collection area 318 is the bottom center of the U-shaped portion in this embodiment. The gravity trap 316 also includes the buffer portion 320 that prevents the formed impurities from reaching the first end portion 306 of the standpipe 302 during fluctuation of the glass surface level. The buffer portion 320 can be designed with a length Y that is sufficient to accommodate expected fluctuations of the glass surface level or flow of glass melt within the standpipe 302. Thus, while glass melt fluctuations may temporarily displace formed impurities from the particle collection area 318, the length Y of the buffer portion 320 will help prevent the particles from reaching the first end portion 306. Rather, the formed impurities will eventually fall back to the particle collection area 318. For example, if the largest decrease of the level of glass surface 312 was measured to be three inches, a value of four inches could be used for length Y. In the embodiment of FIG. 3, the standpipe 302 has a constant diameter A from the first end portion 306 to the second end portion 310 although the diameter may vary through at one or more locations of the standpipe as described below. Indeed, despite variations in the shape of the standpipe, the glass melt will fill the sink portion up to the same level of glass melt under same atmospheric pressure and equal operating conditions such as flow rate.

In the above and following embodiments, the illustrated boundaries of the first end portion, the second end portion, the sink portion, the gravity trap, the particle collection area and the buffer portion should not be construed restrictively so as to limit the demarcation of the each portion or zone to what is shown in the figures.

Figure 4:
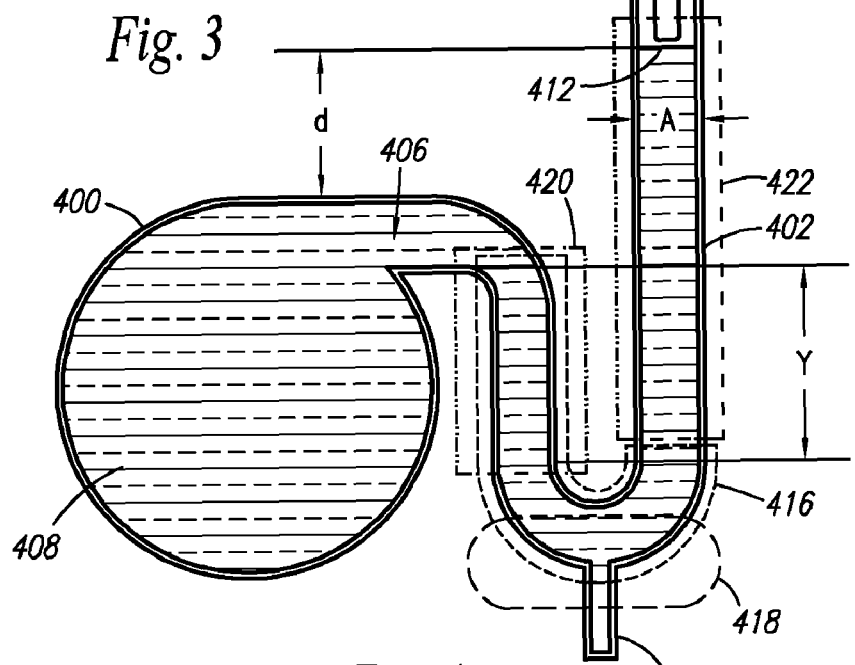

Referring to FIG. 4, a cross-sectional view of another example standpipe 402 is shown. FIG. 4 shows a tube section 400, a standpipe 402, a glass level probe 104, a first end portion 406, glass melt 408, a second end portion 410, a glass surface 412, a gravity trap 416, a particle collection area 418, a buffer portion 420 and a sink portion 422. FIG. 4 is identical to FIG. 3 except that the gravity trap 416 includes a drain 450 for the glass melt 408 that is in fluid communication with the particle collection area 418. The drain 450 can be used to empty the standpipe 402 when glass making is complete or glass composition is changed, or to take a sample of the glass melt 408 in order to analyze the composition or check for formed impurities such as platinum inclusions. In further examples, the drain 450 can be used to periodically clear collected formed impurities from the particle collection area 418. The drain 450 may comprise a variety of mechanisms such as a valve, trap, faucet, spigot or the like.

Figure 5:
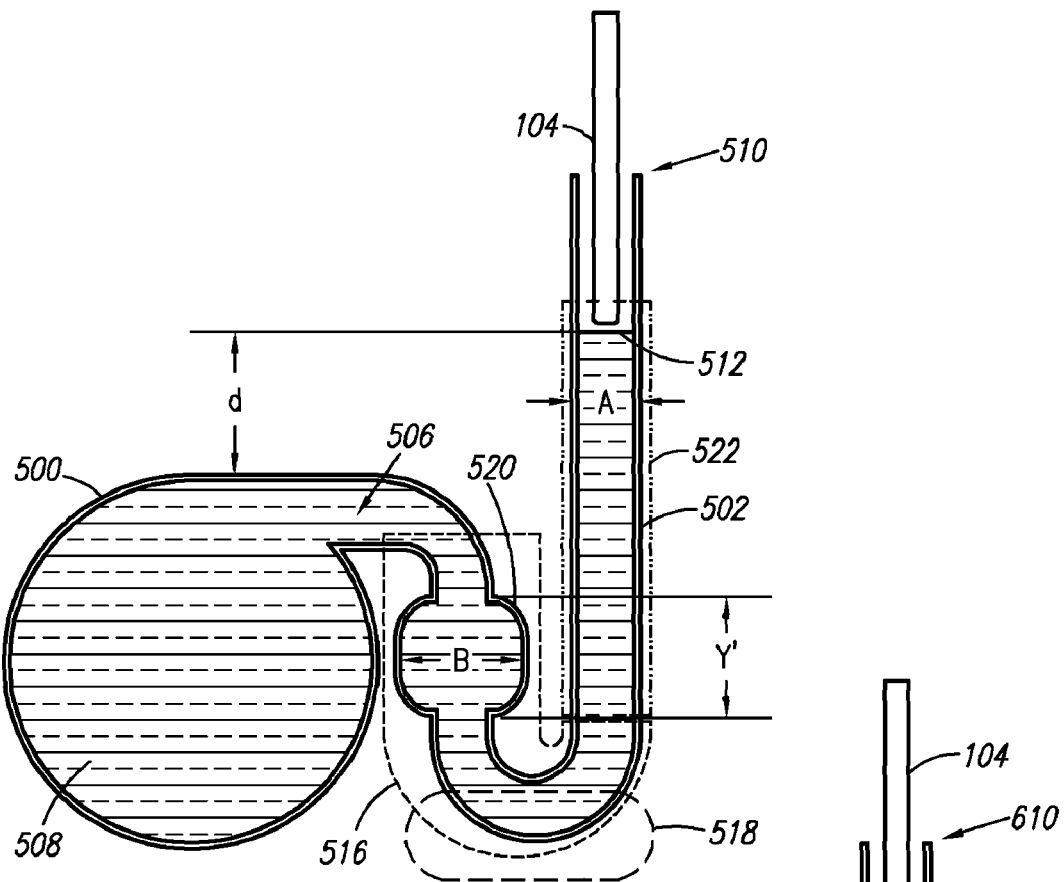

Referring to FIG. 5, a cross-sectional view of yet another embodiment of the standpipe 502 is shown. FIG. 5 shows a tube section 500, a standpipe 502, a glass level probe 104, a first end portion 506, glass melt 508, a second end portion 510, a glass surface 512, a gravity trap 516, a particle collection area 518, a buffer portion 520 and a sink portion 522. The gravity trap 516 may include the particle collection area 518 and the buffer portion 520. The buffer portion 520 is expanded in this embodiment and may be denoted as an accumulator since a diameter "B" along the buffer portion 520 is larger than the diameter A along the rest of the standpipe 502. With such a configuration, the length of the buffer portion 520 can be reduced because the expanded buffer portion 520 can take in a larger volume of glass melt. Thus, due to the expanded buffer portion 520, displacement of glass melt within the sink portion 522 would result in a corresponding reduced displacement of glass melt through the buffer portion 520. Thus, as illustrated, the length Y' of the expanded buffer portion 520 can be shorter than the length Y of a nonexpanded portion while providing the same effective buffer functionality. Providing a shorter buffer portion 520 can be desirable to provide a more compact design. For example, it may be possible to reduce the length of the buffer portion 520 to one quarter of the original length by doubling the original diameter of the buffer portion 520. It should be noted that the buffer portion 520 can take on a variety of three-dimensional shapes and may be a cylinder, a sphere, a polyhedron, or the like as long as a buffer portion 520 with a larger diameter "B" is provided. The edges in the buffer portion 520 may be rounded to streamline the flow of glass melt 508 therethrough.

Figure 6:
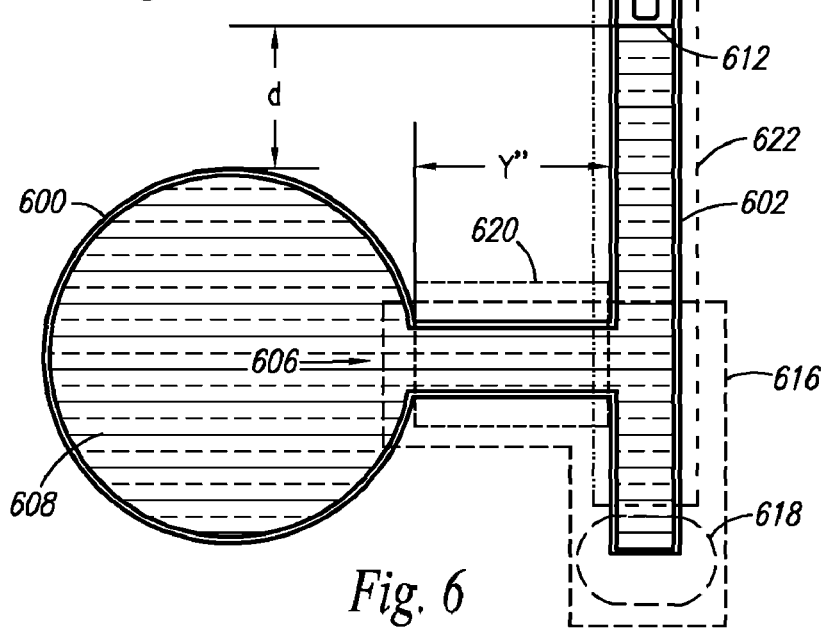

Referring to FIG. 6, a cross-sectional view of still another standpipe 602 is shown. FIG. 6 shows a tube section 600, a standpipe 602, a glass level probe 104, a first end portion 606, glass melt 608, a second end portion 610, a glass surface 612, a gravity trap 616, a particle collection area 618, a buffer portion 620 and a sink portion 622. The gravity trap 616 may include the particle collection area 618, the buffer portion 620 and a part of the sink portion 622. In this embodiment, the particle collection area 618 is located directly under the second end portion 610 and the sink portion 622 such that formed impurities entering through the second end portion 610 are likely to sink or precipitate through the glass melt toward the particle collection area 618. The buffer portion 620, which has a length Y" greater than the maximum amount of fluctuation, extends laterally from the sink portion 622 as to form a T-shaped standpipe 602 extending in a radial direction into the tube section 600 from a side thereof It will be appreciated that the first end portion 606 of the standpipe 602 may be formed elsewhere about the tube section 600. The buffer portion 620 may also be oriented upward at an angle with respect to the sink portion 622.

Figure 7:
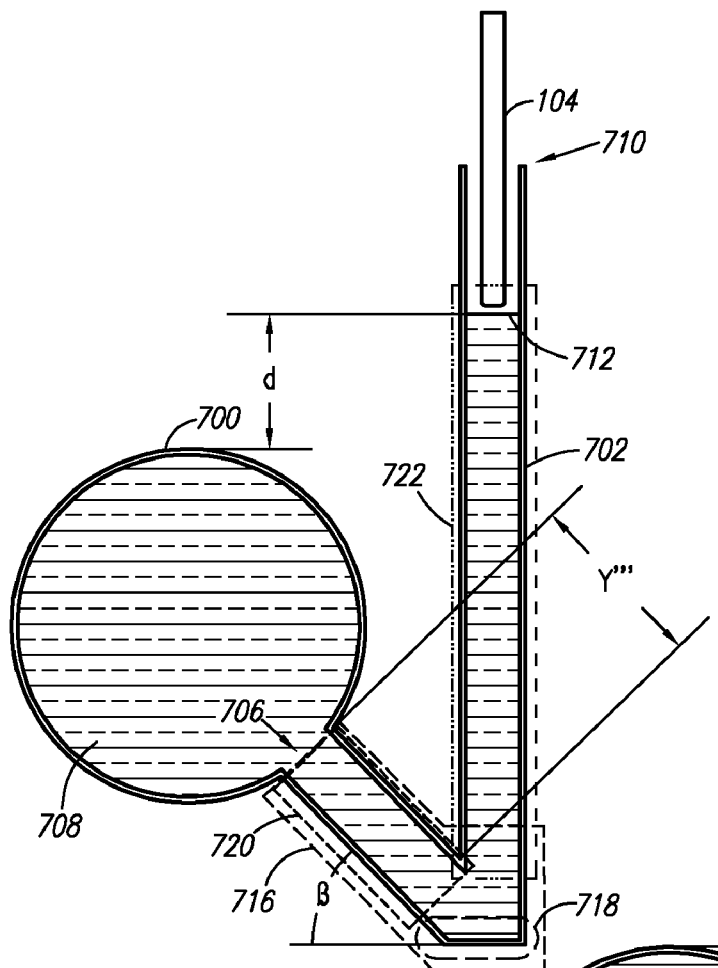

Referring to FIG. 7, a cross-sectional view of another example standpipe 702 is shown. FIG. 7 shows a tube section 700, a standpipe 702, a glass level probe 104, a first end portion 706, glass melt 708, a second end portion 710, a glass surface 712, a gravity trap 716, a particle collection area 718, a buffer portion 720, a sink portion 722. The gravity trap 716 may include the particle collection area 718 and the buffer portion 720. In this embodiment, the particle collection area 718 is formed directly under the sink portion 722. The buffer portion 720 intersects the sink portion 722 at an angle forming an angle β with the horizontal plane. The buffer portion 720 extends in a radial direction into a lower portion of the tube section 700 and has a length Y''' that is greater than the maximum amount of fluctuation such that formed impurities moved from the particle collection area 718 through fluctuation is not allowed to reach the tube section 700.

Figure 8:
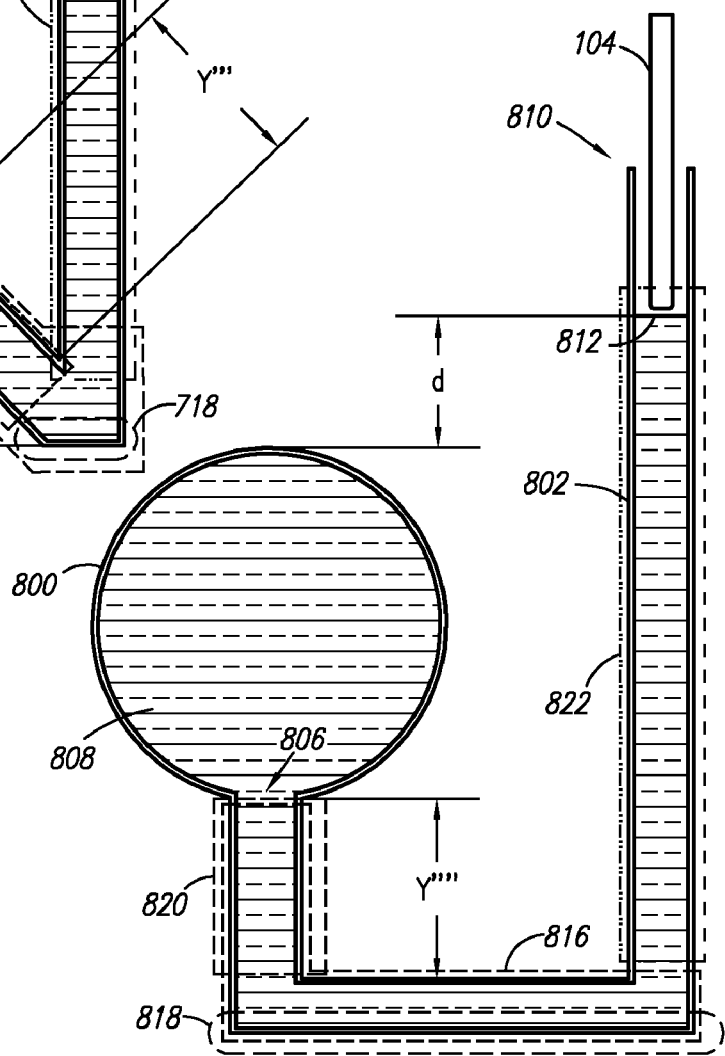

Referring to FIG. 8, a cross-sectional view of still another example standpipe is shown. FIG. 8 shows a tube section 800, a standpipe 802, a glass level probe 104, a first end portion 806, glass melt 808, a second end portion 810, a glass surface 812, a gravity trap 816, a particle collection area 818, a buffer portion 820, a sink portion 822. The gravity trap 816 may include the particle collection area 818 and the buffer portion 820. In this embodiment, the particle collection area 818 is significantly broader than the other embodiments. The sink portion 822 and the buffer portion 820 are vertically oriented while the particle collection area 818 is an elongate, horizontal portion of the standpipe 802. The buffer portion 820 approaches the tube section 800 in a radial direction from underneath although the first end portion 806 may be formed at a different part of the circumference of the tube section 800. Formed impurities precipitating from the sink portion 822 will gather at the particle collection area 818. Moreover, the buffer portion 820, which has length Y"" greater than the maximum amount of fluctuation, prevents the formed impurities at the particle collection area 818 from reaching the tube section 800. The gravity trap 816 may be altered so that the particle collection area 818 and/or the buffer portion 820 are at an orientation other than horizontal or vertical respectively.

An example method of making glass with the apparatus 110 will now be described. The controller 106 can activate the motor 107 to begin introduction of batch material 111 into the melting vessel 114 as indicated by arrow 116. After application of sufficient heat over time, the batch material 111 is reduced to a glass melt 118. The glass melt 118 then flows, in series, through the first connecting tube 121, the fining vessel 120, the second connecting tube 124, the mixing vessel 122, the third connecting tube 128 and into the delivery vessel 126. The glass melt then travels through the downcomer 130 into the inlet 132 to the forming vessel 134. The level of the glass melt in the fining vessel 120 generally matches the level within the standpipe 102. The glass metal probe 104 can measure the glass melt level within the standpipe 102 and send a signal corresponding to the level to the controller 106 by way of communication line 105. The controller 106 can then compare the measured glass melt level to a desired level and send an appropriate signal to the motor 107 in order to modify the batch material delivery rate to achieve the desired level of glass melt within the apparatus. The fluctuation of the glass melt level, if any, is typically about one-eighth of an inch and is often caused when raw materials are fed into the system. However, it may be possible for the fluctuation to be as large as three inches due to other causes such as a power failure.

The methods can further include the step of inhibiting formed impurities from traveling from at least a portion of the standpipe through the first end portion of the standpipe. Various devices and configurations can be incorporated to inhibit formed impurities. For example, as mentioned in the various examples illustrated in FIGS. 3-8, the standpipe is configured with a gravity trap that inhibits formed impurities from reaching the main stream of glass melt flowing through the system and includes a particle collection area and a buffer portion. The formed impurities enter the standpipe through the second end portion and sink in glass melt moving through the sink portion. The platinum inclusions gather like sediments at the particle collection area of the gravity trap that is formed at a portion of the standpipe that is lower than the second end portion thereby allowing the formed impurities to reach the particle collection area through the force of gravity. The standpipe may further include a drain for removing all or a part of the glass melt therein. The gravity trap further includes a buffer portion configured to maintain the particle collection area at a distance from the first end portion. The buffer portion is configured to have a given length that may be larger than the maximum amount of fluctuation occurring in the standpipe.

Moreover, at least a part of the buffer portion is directed upward, whether at an angle or vertical, such that, even if the fluctuation of the glass melt transports the formed impurities toward the first end, the formed impurities will tend to return to the particle collection area after displacement of the glass melt is over. The standpipe may have a constant diameter throughout or may include a portion that differs in diameter. In a standpipe whose diameter is constant from the first end portion through the second end portion, the amount of fluctuation at the glass surface level will translate into the same amount of displacement for the glass melt throughout the standpipe. However, a standpipe having a portion with an expanded diameter, i.e., the accumulator, the accumulator will reduce the amount of translation of the glass melt arising from fluctuation at the glass surface level because the displacement will be dampened at the accumulator.

The present invention should not be construed as encompassing only the shapes or orientations of the first end portion, the second end portion, the sink portion, the buffer portion and the gravity trap shown in the figures. For example, it may be possible for the sink portion to be oriented at an angle. Also, the gravity trap need not be located laterally about the tube section. It is possible to configure a standpipe where the gravity trap is positioned higher or lower than the tube section and obtain the desired inhibiting effect on the formed impurities. Similarly, it is not necessary for the gravity trap or the particle collection area to be lower than the first end portion of the standpipe. As shown by the various embodiments, the standpipe may approach the tube section from any part of the circumference or periphery of the conduit or station. Furthermore, a person of ordinary skill in the art will appreciate that the present invention can prevent not only platinum inclusions but also other formed impurities with a density higher than molten glass from becoming entrained into the flow of glass through the manufacturing system.

It will be apparent to those skilled in the art that various modifications and variations can be made without departing from the spirit and scope of the claimed invention.

What is claimed is:

1. A method of making glass with an apparatus comprising a first glass melt station, a glass melt conduit, and a standpipe, wherein the standpipe includes a first end portion in fluid communication with the glass melt conduit and a gravity trap positioned within a fluid path defined between the first end portion and a second end portion of the standpipe, the method comprising the steps of:
    providing the first glass melt station with glass melt such that a quantity of the glass melt travels through the fluid path from the first end portion to the second end portion to define a glass surface within the standpipe;
    sensing a condition of a quantity of glass melt within the standpipe at the second end portion of the standpipe; and
    inhibiting formed impurities from traveling through the fluid path from the second end portion of the standpipe to the first end portion of the standpipe with the gravity trap by positioning the gravity trap within the fluid path and at a lower elevation relative to the first end portion and the second end portion of the standpipe.

2. The method of claim 1, further comprising the step of providing a second glass melt station in fluid communication with the first glass melt station.

3. The method of claim 2, further comprising the step of providing a glass melt conduit and flowing a glass melt through the glass melt conduit from the first glass melt station to the second glass melt station.

4. The method of claim 3, wherein the first end portion of the standpipe is in fluid communication with the glass melt conduit.

5. The method of claim 1, further comprising the step of reducing a velocity of the glass melt within the standpipe at a location between the gravity trap and the first end portion of the standpipe.

6. The method of claim 1, further comprising the step of controlling the apparatus based on the sensed condition.

7. A method of making glass with an apparatus comprising a first glass melt station, a glass melt conduit, and a standpipe, wherein the standpipe includes a first end portion in fluid communication with the glass melt conduit and a gravity trap positioned between the first end portion and a second end portion of the standpipe, the method comprising the steps of:
    providing the first glass melt station with glass melt;
    sensing a condition of a quantity of glass melt within the standpipe at the second end portion of the standpipe; and
    inhibiting formed impurities from traveling from the second end portion of the standpipe to the first end portion of the standpipe with the gravity trap by positioning the gravity trap at a lower elevation relative to the first end portion and the second end portion of the standpipe.

8. The method of claim 7, further comprising the step of providing a second glass melt station in fluid communication with the first glass melt station.

9. The method of claim 8, further comprising the step of providing a glass melt conduit and flowing a glass melt through the glass melt conduit from the first glass melt station to the second glass melt station.

10. The method of claim 9, wherein the first end portion of the standpipe is in fluid communication with the glass melt conduit.

11. The method of claim 7, further comprising the step of reducing a velocity of the glass melt within the standpipe at a location between the gravity trap and the first end portion of the standpipe.

12. The method of claim 7, further comprising the step of draining formed impurities from the standpipe.

13. The method of claim 7, further comprising the step of controlling the apparatus based on the sensed condition.

14. A method of making glass with an apparatus comprising a first glass melt station, a glass melt conduit, and a standpipe, wherein the standpipe includes a first end portion in fluid communication with the glass melt conduit and a gravity trap positioned within a fluid path defined between the first end portion and a second end portion of the standpipe, the method comprising the steps of:
    providing the first glass melt station with glass melt such that a quantity of the glass melt travels through the fluid path from the first end portion to the second end portion to define a glass surface within the standpipe;
    sensing a condition of a quantity of glass melt within the standpipe at the second end portion of the standpipe; and
    inhibiting formed impurities from traveling to the fluid path from the second end portion of the standpipe through the first end portion of the standpipe with the gravity trap by positioning the gravity trap within the fluid path.

15. The method of claim 14, further comprising the step of providing a second glass melt station in fluid communication with the first glass melt station.

16. The method of claim 15, further comprising the step of providing a glass melt conduit and flowing a glass melt through the glass melt conduit from the first glass melt station to the second glass melt station.

17. The method of claim 16, wherein the first end portion of the standpipe is in fluid communication with the glass melt conduit.

18. The method of claim 14, further comprising the step of reducing a velocity of the glass melt within the standpipe at a location between the gravity trap and the first end portion of the standpipe.

19. The method of claim 14, further comprising the step of draining formed impurities from the standpipe.

20. The method of claim 14, further comprising the step of controlling the apparatus based on the sensed condition.

* * * * *